Figure 1:
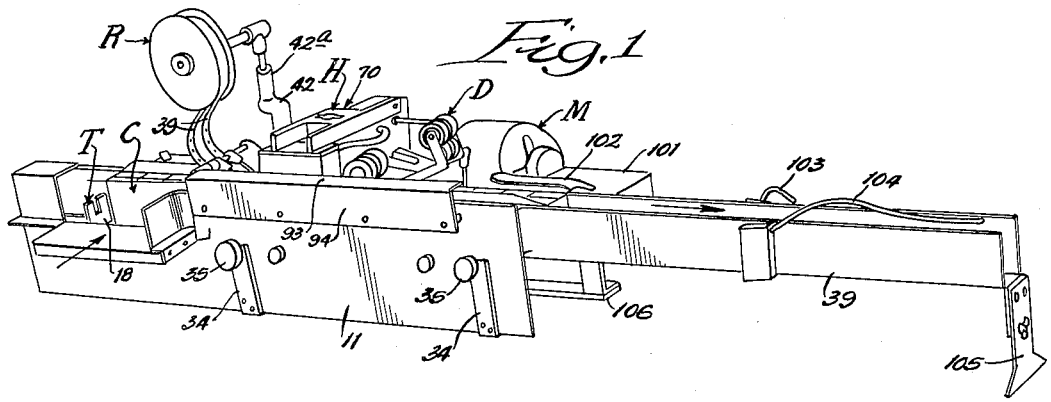

Feb. 28, 1956  R. G. WINN  2,736,448
STAMPING MACHINE
Filed Oct. 20, 1952  3 Sheets-Sheet 1

INVENTOR:
Robert G. Winn,
BY
Dawson, Tilton & Graham,
ATTORNEYS.

Feb. 28, 1956 R. G. WINN 2,736,448
STAMPING MACHINE
Filed Oct. 20, 1952 3 Sheets-Sheet 2
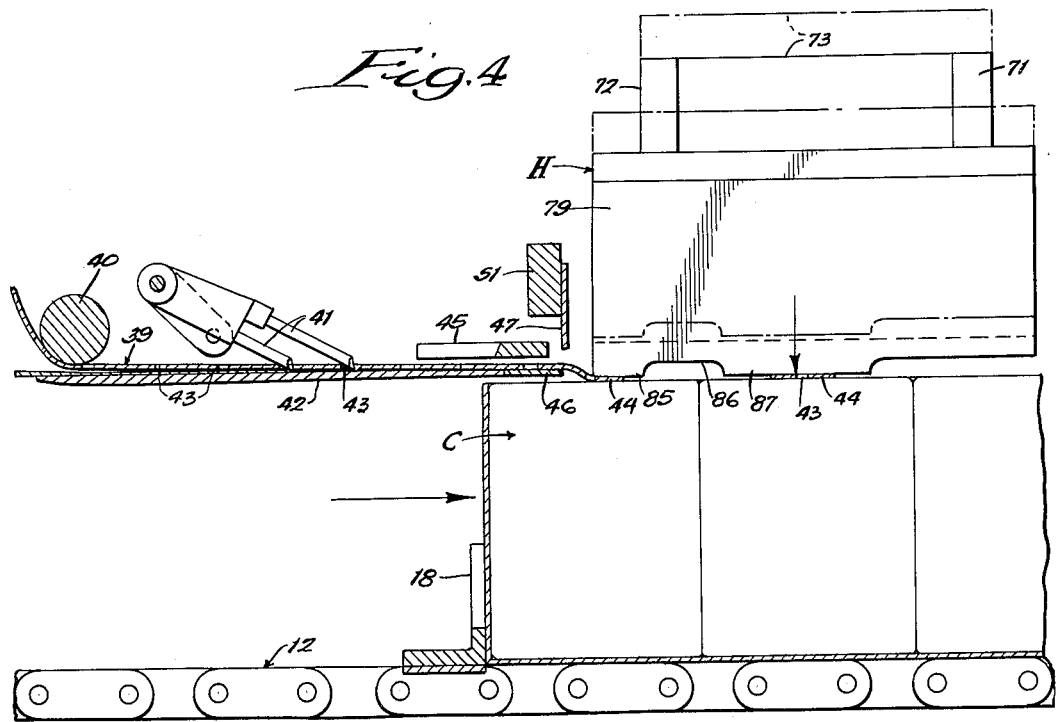
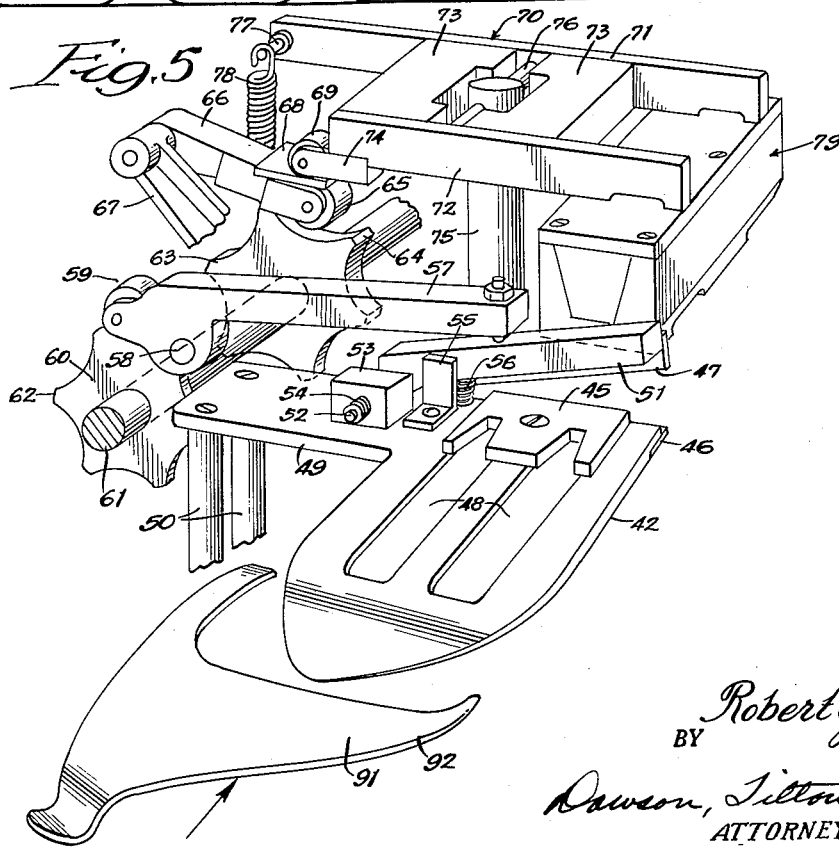
INVENTOR:
Robert G. Winn,
BY
Dawson, Tilton & Graham,
ATTORNEYS.

Feb. 28, 1956  R. G. WINN  2,736,448
STAMPING MACHINE
Filed Oct. 20, 1952  3 Sheets-Sheet 3
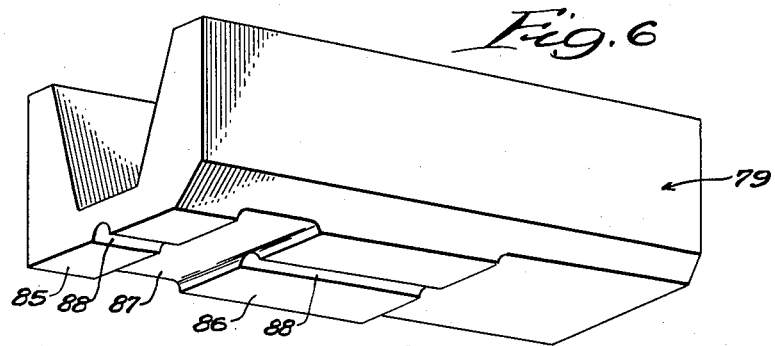
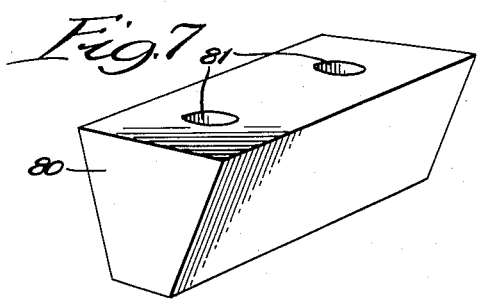
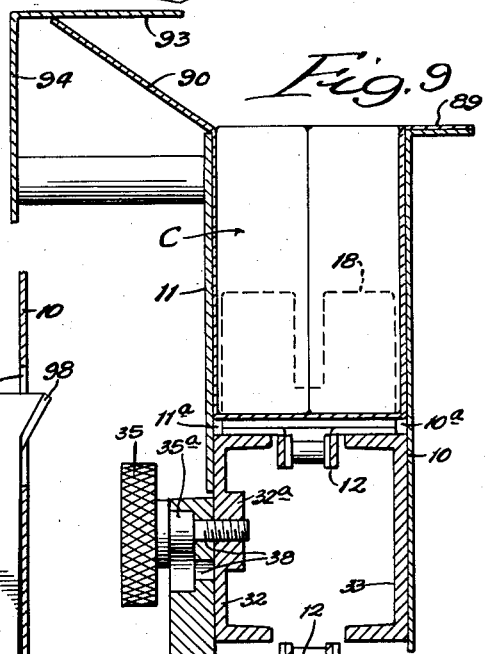
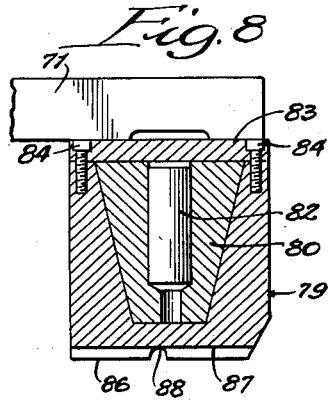
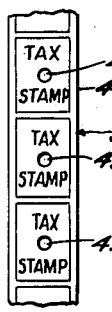
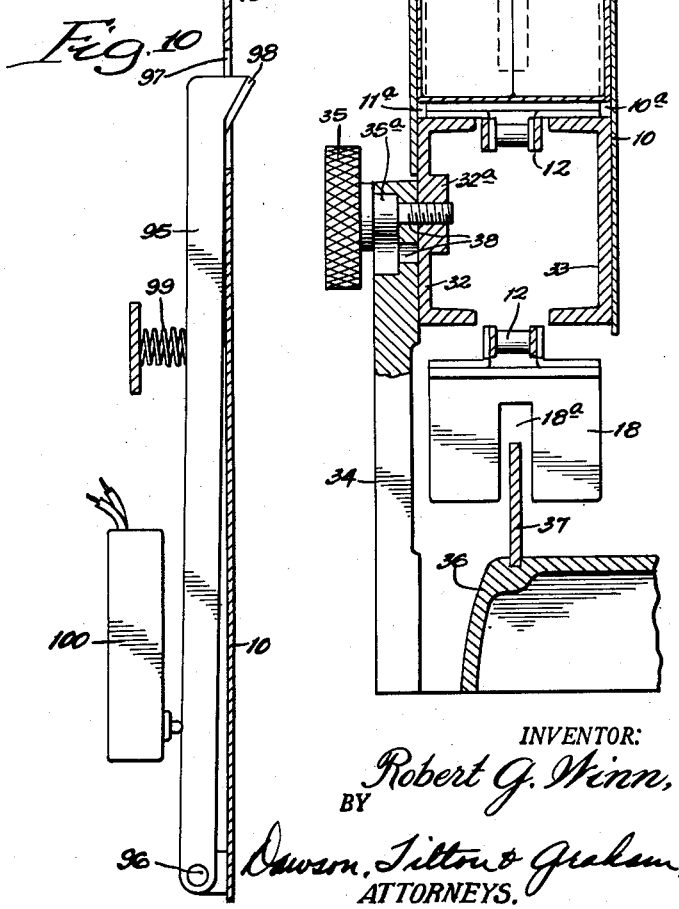
INVENTOR:
Robert G. Winn,
BY
Dawson, Tilton & Graham,
ATTORNEYS.

United States Patent Office 2,736,448
Patented Feb. 28, 1956

2,736,448

STAMPING MACHINE

Robert G. Winn, Oak Park, Ill., assignor to American Decalcomania Company, Inc., Chicago, Ill., a corporation of Illinois Application October 20, 1952, Serial No. 315,635

8 Claims. (Cl. 216—30)

This invention relates to a stamping machine and more particularly to an improved stamping machine for applying cigarette tax stamps to packages of cigarettes. The present application is a continuation-in-part of my copending application, Serial No. 227,150, filed May 19, 1951, for Stamping Machine, now Patent 2,648,453 issued Aug. 11, 1953.

Cigarettes are subjected to numerous taxes, both Federal and State, and the payment of the applicable tax is generally indicated by the placing of a tax stamp upon the packages of cigarettes. While the Federal tax applies to all of the cigarettes manufactured in this country and the tax stamp may therefore be applied at the factory, State tax stamps must be applied locally and after the cigarettes have been shipped from the factory. Since cigarettes are transported and sold in cardboard cartons each of which contains ten packages of twenty cigarettes each, and since tax stamps such as those associated with State sales taxes on cigarettes must be applied to each individual package to satisfy the applicable laws, it is desirable to apply the tax stamp to each of the finished packages while supported in the cardboard carton.

A method and apparatus for applying such stamps to cigarette packages is disclosed in United States Patent No. 2,516,783 issued July 25, 1950, and in copending application Serial No. 227,150 for Stamping Machine, now Patent 2,648,453 issued August 11, 1953. While the structures disclosed in this patent and application are highly advantageous in many respects, certain problems have been encountered in connection with their use. In both of these structures a roll of stamps is supported above a conveyor mechanism upon which is supported open cartons of cigarettes. A strip of stamps from the roll is fed downwardly to a position above the packaged cigarettes where each is severed from the strip and is then affixed to a cigarette package by suitable means. After the stamp is firmly affixed to the cigarette package the stamp is then cancelled in a subsequent operation.

It has been found that between the severing of a stamp from the roll and before the stamp is secured to the cigarette package, slight movements about the stamping machine result in air currents that may carry the stamp from its designated position upon the cigarette package and into a position where the sealing or securing apparatus is not effective for affixing the stamp to the package. Moreover, excessive vibration of the stamping machine may have the same effect and disturb the proper positioning of the stamp upon the package. Further, a stamp not properly secured to the cigarette package cannot be cancelled.

Since it is essential for compliance with the local laws that each package have a stamp affixed thereto and that each stamp be properly cancelled, the above results are undesirable. In addition, stamps are wasted when such actions occur.

It is accordingly an object of this invention to provide improved stamping apparatus that will obviate the deficiencies encountered in prior machines. Another object of the invention is to tack each stamp to the cigarette package during the operation wherein the stamp is severed from the stamp roll. Yet another object is to tack each tax stamp to a cigarette package by means of a heat seal at the same time that the stamp is cut from the stamp roll. A further object is to completely affix each stamp by means of a heat seal to the cigarette package in a subsequent operation that is carried on simultaneously with the cutting and tacking of a stamp to another cigarette package.

Additional objects and advantages will appear as the specification proceeds.

The invention is shown in an illustrative embodiment in the accompanying drawing, in which—

Figure 2:
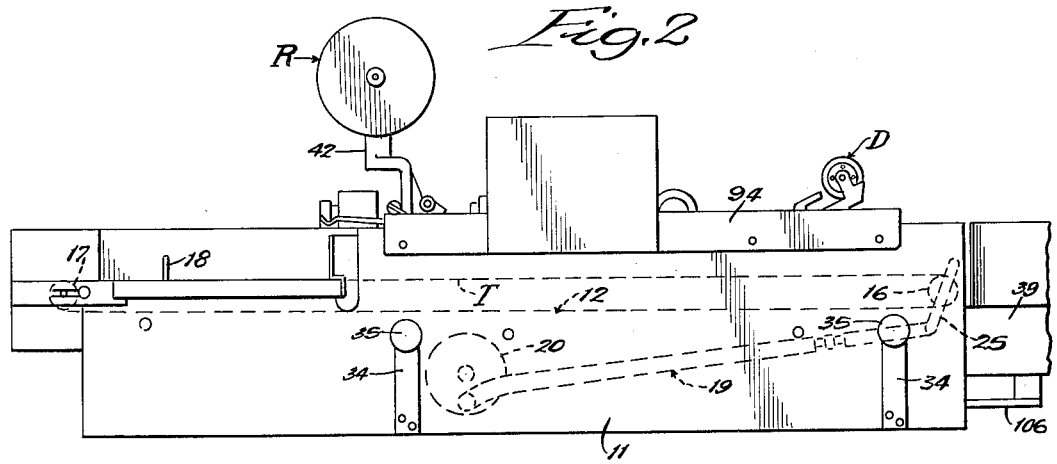
Figure 3:
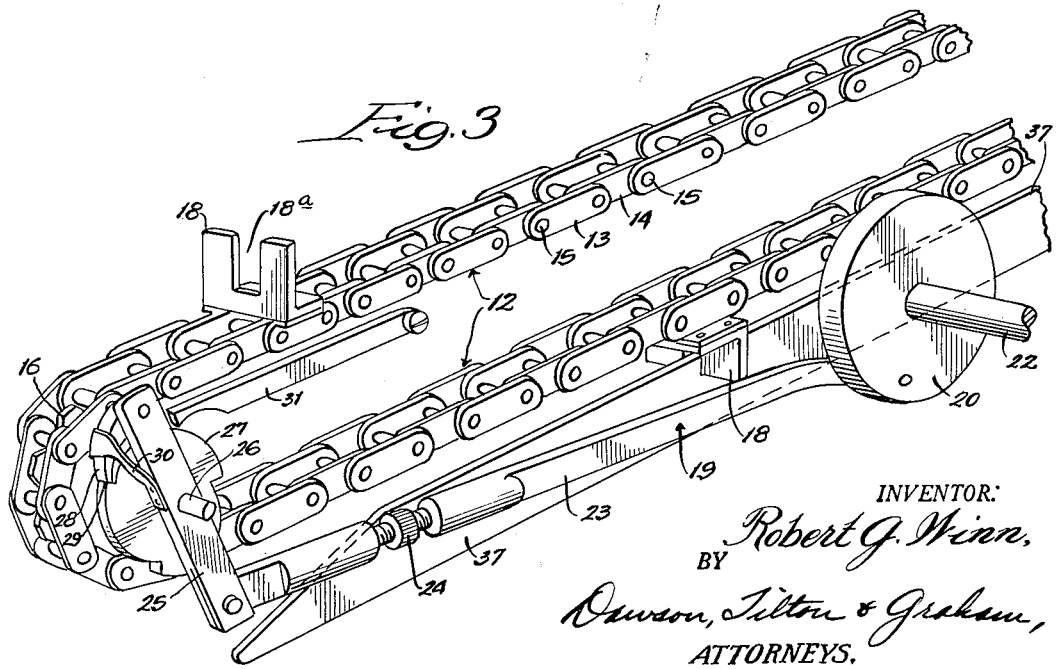

Figure 1 is a perspective view of a complete stamping machine incorporating the present invention; Fig. 2 is a broken side view in elevation; Fig. 3 is an enlarged broken perspective view of the conveyor chain; Fig. 4 is an enlarged broken side view showing the apparatus partly in section and partly in elevation; Fig. 5 is an enlarged perspective view showing the heat sealing and stamp severing assembly; Fig. 6 is a perspective view of the heat sealing block; Fig. 7 is a perspective view of the heat block insert; Fig. 8 is a sectional view taken on a plane transverse to the longitudinal axis of the heat sealing block assembly; Fig. 9 is a sectional view of the track structure taken in a plane transverse to the longitudinal axis of the track and showing a carton of cigarettes in position upon the track; Fig. 10 is a top plan view of a switch assembly; and Fig. 11 is a broken front view in elevation of a strip of tax stamps.

In Fig. 1 is seen a perspective view of a complete stamping machine embodying my invention. In this apparatus, cartons C of cigarettes are fed into the left end of the machine and onto a track T. The cartons of cigarettes are moved to the right along the track T and each of the packages of cigarettes receives a tax stamp fed from a roll of stamps R. Each stamp is affixed to its respective package by a heat sealing unit H. A stamp cancelling unit D cancels or validates each of the stamps after they are affixed to the packages. A motor M actuates the various components of the machine in timed relation by suitable gearing arrangements.

The track T includes a pair of vertical guide walls 10 and 11 which snugly receive the carton C, as illustrated best in Fig. 9. The bottom of the track is provided by a pair of rails 10a and 11a along which the carton slides and a continuous conveyor chain 12 (seen best in Fig. 3). The endless chain 12 is conventional in construction and includes the usual links 13 and 14 and pivotal connections 15. The chain is flexible and is entrained at opposite ends of the stamping machine about sprockets 16 and 17. L-shaped pawls 18 having an outwardly-extending leg recessed at 18a are carried by the chain 12 at spaced points and provide an abutment or engagement for the cartons C and carry the cartons forwardly along the track. Special links equipped with laterally-extending platforms provide a mounting for the pawls 18.

The chain 12 advances the cartons of cigarettes forwardly with step-by-step movements so that each pair of cigarette packages within the carton are successively positioned adjacent the tax stamp discharge station and heat sealing unit H. The intermittent movement is imparted to the chain 12 by a crank arm assembly 19. The assembly 19 consists of a wheel 20 rotatably driven by a shaft 22 which in turn is rotatably driven by the motor M through a suitable gearing arrangement (not shown, but described in detail in Patent No. 2,516,783 and application Serial No. 227,150 now Patent 2,648,453).

Pivotally secured to the wheel 20 adjacent the periphery thereof is a crank arm 23 that is preferably equipped with an adjusting means 24. Pivotally secured to the end of the arm 23, which has been flattened to provide a mounting therefor, is an arm 25 having a bifurcated end portion. The arm 25 is rotatably mounted upon an axle 26 that carries a ratchet wheel 27. The opposite end of the arm 25 pivotally supports a dog 28. The dog 28 is pointed adjacent one end and the pointed end thereof is adapted to be received within spaced notches 29 with which the ratchet wheel 27 is provided. A spring arm 30 carried by the arm 25 abuts the dog 28 and urges it against the periphery of the ratchet wheel 27. Rotational motion of the wheel 20 results in reciprocating motion of the arms 23 and 25 with the result that the ratchet wheel 27 is rotated with an intermittent motion. A locking pawl 31 is adapted to engage the notches 29 of the ratchet wheel 27 and prevents it from being rotated in the opposite direction. The sprocket 16 may be carried by the axle 26 or otherwise secured to the ratchet wheel 27 whereby movement of the ratchet wheel moves the chain 12 a predetermined distance and with intermittent motion.

The sprockets 16 and 17 are supported in spaced-apart U-shaped channels 32 and 33 (seen best in Fig. 9). The channels 32 and 33 are fixed to a frame 34 by means of bolts 35. A base 36 provides a support for the heat seal unit, motor, cancelling unit, etc., in a manner described in detail in the patent and application previously referred to. An elongated bar 37 carried by the base 36 and extending longitudinally thereof is received within the slots 18a on the return pass of the pawls 18 and limits any whip or side lash in the chain 12.

It is desired that the stamping machine be adaptable to affix tax stamps to both regular size and long or "king size" packages of cigarettes. For this purpose the track T is made adjustable and may be moved downwardly with respect to the remainder of the apparatus when it is desired to affix tax stamps to packages of the long cigarettes. This adjustability is provided through the bolt 35 which is equipped with a knurled head to facilitate tightening and loosening of the bolt within the frame and spaced apertures 38 provided by the frame. The channel 32 is provided with a threaded boss 32a that receives the threaded end of the bolt 35. The bolt 35 is equipped with a shoulder 35a that is receivable within the counterbore portion with which both of the apertures 38 are provided. Thus, in the position illustrated in Fig. 9 the bolt 35 extends through the upper aperture 38 and positions the channel 32 in a raised position suitable for handling cartons of regular sized cigarettes. However, if the bolt 35 is removed and inserted through the lower aperture 38 and the channels 32 and 33 lowered a corresponding distance, the track T will be moved downwardly and into a position suitable for handling packages of cigarettes of longer length.

As seen best in Figs. 1 and 4, when a carton of cigarettes is fed onto the track T at the input end of the machine and is carried forwardly by the continuous conveyor means 12 by the intermittent movement thereof (the distance the cigarette carton is carried forwardly by each movement of the conveyor is equal to the distance between the center-to-center spacing of adjacent packs of cigarettes within the carton), each pair of cigarette packages is brought to rest adjacent the stamp feed station. Two stamp strips 39 are pulled from the rolls R over an idler guide roller 40 by means of feeder fingers 41. The rolls R are supported for free rotational movement upon the support structure 42a. Upon each movement of the conveyor chain 12 the feeder fingers 41 push the strip of stamps 39 forwardly along the plate 42 a distance equal to the length of one stamp. There are two feeder fingers for each row of stamps and the feeder fingers are aligned and enter apertures 43 provided in each of the stamps 44 (seen best in Fig. 11). For the purposes of this invention it is sufficient to say that the feeder fingers 41 reciprocate and upon each movement thereof carry the stamp strips 39 forwardly a distance equal to the length of a tax stamp. This structure is described in great detail in patent application Serial No. 227,150 for Stamping Machine, now Patent 2,648,453 issued August 11, 1953, and in Patent No. 2,516,783. A guide plate 45 spaced above the plate 42 insures that the stamp strip 39 slides along the plate 42.

The cigarette stamps are backed with a heat-sensitive or thermo adhesive, and any of the well known compositions capable of softening upon the application of a heated member to the face of the stamps may be used.

It can be seen best in Fig. 4 that when a pair of cigarette packages are in a position to receive the tax stamps 44 a stamp is pushed forwardly of a cutting plate 46 by the reciprocating fingers 41. In this position the simultaneous action of a cutting knife 47 and the heat sealing unit H severs and tacks the stamps in proper position upon the cigarette packages. By reference to Fig. 5 it is seen that the plate 42 is equipped with a pair of spaced-apart elongated slots 48 to permit the fingers 41 to push through the apertures 43 in the stamps and to insure the forward movement of the stamp strip. The cutting plate 46 is carried at the forward end of the plate 42 while the guide plate 45 may be secured in position above the plate 42 by means of a screw or other suitable arrangement. The plate 42 is equipped with a laterally-extending flange portion 49 rigidly secured to support members 50 by any suitable means such as the screws illustrated. The cutting knife 47 is rigidly carried by a block member 51 equipped with an axle or rod 52 pivotally mounted within a bearing block 53 rigidly carried upon the flange portion 49. A coil spring 54 normally urges the block and cutting knife toward the rear of the plate 42 so that the knife will cooperate with the cutting plate 46 to sever the stamp completely from the stamp strip.

An L-shaped bracket 55 mounted upon the plate 42 slidably engages the block member 51 and limits the rearward movement of the knife and block under the urging of the spring 54. A helical spring 56 biases the cutting knife in an upward position so that it is normally spaced above the cutting plate 46 and stamps may be fed upon the cigarette packages without interference by the cutting knife.

The downward or cutting movement is applied to the knife 47 by means of a cam assembly including an elongated cam arm 57 pivotally supported on a pin 58. If desired, an adjustable set screw may extend through the forward end of the arm 57 to provide a fine adjustment for the movement of the cutting knife under the urging of the cam arm.

Rearwardly the cam arm 57 rotatably carries a cam follower 59 that rides upon the periphery of a cam 60. The cam 60 is fixed upon a shaft 61 and is equipped with a plurality of spaced protuberances 62 that move the cam follower 59 upwardly and through the cam arm 57 actuate the severing knife 47.

Also carried upon the common shaft 61 is a cam 63 having a plurality of spaced protuberances 64. Urged into engagement with the periphery of the cam 62 is a cam follower 65 rotatably carried by a cam arm 66 pivotally supported at its outer end upon a bracket 67. The bracket 67 is secured at its other end to the base of the apparatus.

The vertical movement caused by the cam 63 is transferred through the cam follower 65 by means of a wear plate 68 and roller 69 to the heat seal support bracket 70. The bracket 70 has two arms 71 and 72 spaced apart by spacers 73 and rigidly secured thereto. The roller 69 is mounted upon the arm 72 by means of a support channel 74. The heat seal bracket or presser member 70 is carried upon a fixed post 75 by means of a rod 76 extending between the arms 71 and 72 and pivotally received within a passage provided adjacent the upper end of the fixed post 75. The arm 71 is elongated and extends rearwardly and is equipped at its rear end with a laterally-extending pin 77. A spring 78 secured at one end to the pin 77 and at the other end to a suitable mounting therefor normally urges or biases the portion of the presser member 70 rearwardly of the fixed post 75 in a downward direction so that the forward portion of the presser is raised a considerable distance above the track T.

Any suitable means for moving the hammer member or heat seal block 79 downwardly and into engagement with the stamps may be used, but the presser apparatus described has been found effective and desirable for this purpose. The hammer 79 is carried upon forwardly-extending portions of the arms 71 and 72 so that pivotal movement of the presser member about the axis provided by the rod 76 and resulting from the cam action previously described moves the hammer 79 downwardly in timed relation with the cutting knife 47 and movement of the track and feeder fingers to secure a stamp to each package of cigarettes.

It is seen best in Fig. 6 that the presser member or heat sealing member consists of an elongated hammer or block 79 having a hollowed-out central portion in the general shape of a V. The hammer 79 may be made of any suitable material, preferably having a high coefficient of heat conductivity, such as copper or aluminum. An insert or filler member 80 having spaced transverse passages 81 therethrough is adapted to be received within the cut-out portion of the hammer 79. Any suitable means can be provided for heating the hammer member, and in the illustration given a cartridge type resistance heating element 82 is received within the passages or wells 81. A suitable electrical circuit will heat the element 82 and thereby the hammer 79. As seen in Fig. 8, a cover plate 83 is secured to the hammer member 79 and locks in place both the filler member 80 and the heating cartridges 82. Cap screws 84 may be used to secure the cover 83 in place upon the hammer member. The cover 83 in turn is rigidly secured to the forwardly-extending portions of the arms 71 and 72. Pivotal movement of the arms 71 and 72 about the axis 76 will lower the hammer 79 into pressing engagement with cigarette packages disposed therebelow.

The head or pressing surface of the hammer 79 (Fig. 6) consists of two portions—a tacking head or portion 85 that is relatively short in length, and a sealing surface 86 which is relatively long. The tacking and securing surfaces are spaced apart by a recess or channel 87 and each of the heads or surfaces 85 and 86 is formed in two sections spaced apart by a semicylindrical recess 88. Each section of the tacking head 85 and the securing head 86 is adapted to press against a package of cigarettes as a carton of cigarettes is advanced along the conveyor track T. As is well known, a carton of cigarettes contains ten packages disposed in two rows having five packages each, resulting in side-by-side pairs of packages.

Through the cam arrangement disclosed, the cutting knife 47 and the heat sealing member 79 move downwardly simultaneously and as the cutting knife severs a stamp from the strip of stamps fed over the cutting plate 46, the presser member moves downwardly and the tacking head 85 presses a stamp 44 against the edge of the cigarette package disposed thereunder. Preferably, then, the hammer or presser member and the cutting knife 47 move together to simultaneously tack and sever a tax stamp. However, the important relationship between these elements consists in the presser member tacking the stamp to the package prior to the stamp being completely severed from the strip of stamps 39. It is intended that the tacking occur prior to complete severance of the stamps so that a positive positioning of the stamp upon a package is obtained. It is contemplated then that the tacking occur sometime prior to the complete severance of the stamp from the stamp strip and preferably the hammer and knife move together to simultaneously operate against the stamp to tack and sever it.

It is believed that by reference to Fig. 4 it is readily seen that after a stamp has been severed and tacked to a cigarette package the conveyor chain 12 advances the package having the stamp tacked thereon a distance equal to the center-to-center spacing between the cigarette packages and this degree of advance places the package beneath the sealing head 86 of the hammer or presser member 79. Therefore, since the tacking and securing heads are carried by a single member, when the tacking head 85 is pressing a stamp against a cigarette package to tack the same thereon, the securing head 86 simultaneously therewith is securing in its entirety to a package a stamp that has previously been tacked to the package.

The general practice is to cancel or validate the tax stamps as soon as they are placed upon the packages of cigarettes. For this purpose a cancelling mechanism D is provided which is mounted above the track T and to the right of the heat sealing apparatus H as viewed in Fig. 1. The cancelling mechanism may consist of any suitable means for placing a mark upon the face of the stamps. For example, a number may be assigned to a dealer or distributor, and his number placed upon the stamp signifies its validation. The cancelling mechanism may, then, include a number embossed at spaced points upon a wheel that rotates so as to brush the embossed numbers across an inking surface. The cancelling mechanism will be timed with the intermittent movement of the conveyor assembly so that the number wheel or cancelling wheel prints a number on each of the stamps carried by a cigarette package. It is believed that the above description is sufficient for purposes of this invention, and a detailed description of the cancelling mechanism may be had by reference to co-pending application Serial No. 227,150, now Patent 2,648,453, previously referred to.

Conceivably the stamping machine illustrated may incorporate carton opening means such as described in detail in Patent No. 2,516,783 issued July 25, 1950. However, in the apparatus illustrated, each carton is opened prior to being placed upon the track T and, when opened along an edge, two flaps result—a relatively narrow flap 89 and a wide flap 90 (Fig. 9). When placing the opened carton upon the track, the narrow flap 89 slides under a guide member 91 (Fig. 5) mounted rearwardly of the plate 42. Guide member 91 has a curved outer edge 92 against which the relatively wide flap 90 slides and the curved edge is effective to turn the flap 90 outwardly and downwardly so that it slides beneath the flat horizontal surface 93 of a flap holder 94. Both of the flaps are held away from the cigarette packages and do not then interfere with the stamp securing and cancelling operations.

In order to safeguard the apparatus and prevent losses of stamps, jamming of the mechanism, etc., a trigger or switch mechanism is provided to cause the operative elements to function only when a carton is positioned for stamping. The construction of this trigger mechanism is seen best in Fig. 10 wherein an elongated arm 95 is pivotally secured to a post 96 carried by the guide wall 10. The guide wall is equipped with a slot 97 through which a laterally-extending ear 98 carried at the forward end of the arm 95 projects. A spring 99 biases the arm 95 so that the ear projects inwardly through the guide wall and in the path of the advancing cigarette packages. When a carton of cigarettes is moving through the conveyor, the forward end of the arm 95 is pivoted outwardly and a switch 100 is triggered, thereby conditioning the apparatus for operation.

I desire to provide means for re-sealing the cartons after stamps have been applied to each of the packages and after the stamps have been cancelled. For this purpose I employ a glue pot 101 feeding a suitable glue to a glue applicator 102 that is elongated and applies glue to the narrow flap 89 while at the same time folding the flap downwardly upon the packages within the carton. As the conveyor moves the carton forwardly, a spring member 103 secured to a guide wall of the discharge guide 39 holds the narrow flap 89 down upon the cigarette packages while an elongated spring member 104 secured to the opposite wall of the output guide folds the wide flap 90 downwardly and presses it against the glue-covered surface of the narrow flap 89 and is thereby operative to seal the carton. The discharge guide 39 is equipped at its discharge end with an adjustable foot 105 that supports the outer end of the guide while a suitable bracket assembly 106 mounted upon the base 36 supports the guide adjacent its rearward end. Details of the glue pot 101 and applicator 102 may be obtained by reference to Patent No. 2,516,783.

In operation, an open carton of cigarettes is placed upon the track T and the conveyor chain 12 advances the carton with step-by-step, intermittent movement. The distance of each movement is equal to the center-to-center spacing between adjacent packages of cigarettes. The carton flaps are held outwardly from the carton as previously described so as to not interfere with the stamping operations. When the conveyor has positioned a pair of cigarette packages beneath the cutting knife 47 and tacking head 85 of the presser or hammer member 79, a strip of tax stamps carried by the roll R has been advanced by reciprocating movement of the feeder fingers 41 cooperating with the apertures 43 in the stamp strip and a stamp 44 is in position above the cigarette package disposed beneath the knife and tacking head. The knife 47 and presser member 79 move downwardly and the tacking head 85 tacks or partially secures a stamp 44 to the cigarette package prior to the stamp's being severed completely from the strip 39. In this manner positive and accurate positioning of the stamp upon a package is assured.

The conveyor then advances the cigarette packages until a second pair of packages are disposed beneath the hammer and tacker and the previously tacked packages are positioned below the securing head 86 of the presser member. The severing and tacking operations are then repeated and simultaneously therewith the securing head 86 is moved downwardly against the package having a stamp previously tacked thereon and this stamp is secured in its entirety to the package.

Further advance of the carton of cigarettes brings the packages beneath the cancelling apparatus D and each stamp is validated by having a cancellation mark placed thereon. Subsequent to the cancelling operation the flaps are folded into place and after glue has been applied as necessary the flaps are pressed together to re-seal the carton, and the carton is discharged from the apparatus.

While in the foregoing specification I have set forth specific details of my invention for purposes of illustrating an embodiment thereof, it will be apparent to those skilled in the art that many of these details can be varied widely without departing from the spirit of my invention.

I claim:

1. In apparatus for affixing stamps to a series of packages advancing intermittently in step by step stages along a track, a presser member mounted for cyclic movement toward and away from said track for engagement with packages advancing therealong, means for moving said presser member in synchronous relation with the step by step advance of said packages, said presser member being equipped with both a tacking head and spaced therefrom toward the discharge end of said track a securing head, and means for placing a stamp upon each of said packages in their advance along said track, said tacking head being operative to partially secure a stamp to one package of said series and said securing head being operative to completely affix a partially secured stamp to another package of said series during each cycle of said presser member.

2. The apparatus of claim 1 in which said stamps are placed upon said packages from a parent roll, and in which knife means are provided, operative in timed relation with said presser member, to sever a single stamp from said parent roll, said knife means and presser member being arranged so that a stamp is partially secured to a package substantially simultaneous with the severing of the stamp from the parent roll.

3. In apparatus for affixing stamps coated with a heat sensitive adhesive to packages advancing intermittently in step by step stages along a track, a presser member mounted for cyclic movement toward and away from said track for engagement with said packages advancing therealong, means for moving said presser member in timed relation with the step by step advance of said packages, said presser member being equipped with both a tacking head and spaced therefrom toward the discharge end of said track a securing head, said tacking head being smaller than said securing head and being arranged to engage but a portion of a stamp, means for heating said tacking head and securing head, and means for placing a stamp upon each of said packages in their advance along said track, said tacking head being operative when said presser member is moved toward said track to engage and partially secure a stamp upon one package of said group and said securing head being operative when said presser member is moved toward said track to engage and completely affix a partially secured stamp upon another package of said group, the operation of said heads being substantially simultaneous and engagement thereof with the stamps being for the same period of time.

4. The apparatus of claim 3 in which said presser member comprises an elongated hammer equipped with said tacking and securing heads and having a hollowed out center portion, a filler member adapted to be received within said hollowed out center portion and being provided with transversely extending chambers therein alignable respectively with said tacking and securing heads, and heating cartridges receivable within said chambers for heating said tacking and securing heads.

5. A presser member comprising an elongated hammer having a bottom wall and side walls extending upwardly therefrom in spaced-apart relation to provide a longitudinally extending channel through said hammer, said bottom wall having spaced-apart depending portions providing a tacking head and a securing head, a filler member conforming substantially to the configuration of said channel and being received therein, said filler member having transversely extending passages therethrough alignable respectively with said tacking and said securing heads, and heating cartridges in said passages for heating said tacking and securing heads.

6. The apparatus of claim 3 in which said stamps are placed upon said packages from a parent roll, and in which knife means are provided, operative in timed relation with said presser member, to sever a single stamp from said parent roll, said knife means and presser member being arranged so that a stamp is partially secured to a package substantially simultaneous with the severing of the stamp from the parent roll.

7. In apparatus for severing stamps from a parent roll and affixing them to packages advancing intermittently in step by step relation along a track, a presser member mounted for cyclic movement toward and away from said track for engagement with packages advancing therealong, said presser member being provided with a tacking head for partially securing a stamp upon a package, a knife arranged and operative to sever stamps one by one from the parent roll, and means for synchronizing the operation of said knife with that of said presser member so that a stamp is severed and partially sealed to a package substantially simultaneously, said last mentioned means comprising an elongated lever arm engageable with said knife for actuating the same, a shaft, a first cam secured to said shaft, a cam follower carried by said lever arm and coacting with said first cam, a second cam secured to said shaft, and cam follower means operatively arranged with said second cam and with said presser member for rotating said second cam and the shaft secured thereto upon each cyclic movement of said presser member, whereby said knife is synchronized with said tacking head for simultaneous operation therewith.

8. In an apparatus for affixing stamps upon a series of adjacent packages intermittently advancing step by step along a track, a presser member movably mounted for cyclic movement toward and away from said packages, means for moving said presser member in synchronized relation with the step-by-step advancement of said packages, said presser member being equipped with both a tacking head and a securing head spaced therefrom, and means for placing a stamp upon each of said packages in their advancement along said track, said tacking head being operative to engage and partially secure a stamp upon a package during one cycle of said presser member and said securing head being operative to completely affix the partially secured stamp upon said package during the next cycle of said presser member.

References Cited in the file of this patent

UNITED STATES PATENTS

| | | |
|---|---|---|
| 2,286,159 | Reynolds | June 9, 1942 |
| 2,326,436 | Caldwell | Aug. 10, 1943 |
| 2,578,329 | Von Hofe | Dec. 11, 1951 |

FOREIGN PATENTS

| | | |
|---|---|---|
| 626,238 | Great Britain | July 12, 1949 |